United States Patent
Morinaga et al.

(10) Patent No.: US 9,305,399 B2
(45) Date of Patent: Apr. 5, 2016

(54) APPARATUS AND METHOD FOR DISPLAYING OBJECTS

(75) Inventors: Yasuo Morinaga, Chiyoda-ku (JP); Manabu Ota, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 36 days.

(21) Appl. No.: 13/878,634

(22) PCT Filed: Jun. 29, 2012

(86) PCT No.: PCT/JP2012/066770
§ 371 (c)(1),
(2), (4) Date: Apr. 10, 2013

(87) PCT Pub. No.: WO2013/008653
PCT Pub. Date: Jan. 17, 2013

(65) Prior Publication Data
US 2014/0139552 A1    May 22, 2014

(30) Foreign Application Priority Data

Jul. 14, 2011  (JP) ................................. 2011-156053

(51) Int. Cl.
| | |
|---|---|
| G06T 19/00 | (2011.01) |
| G06T 5/00 | (2006.01) |
| G06T 11/00 | (2006.01) |
| G06T 7/40 | (2006.01) |

(52) U.S. Cl.
CPC ............... *G06T 19/006* (2013.01); *G06T 5/006* (2013.01); *G06T 5/007* (2013.01); *G06T 7/408* (2013.01); *G06T 11/00* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 6,396,495 | B1 * | 5/2002 | Parghi et al. | ... 345/426 |
| 7,742,637 | B2 | 6/2010 | Xiao et al. | |

(Continued)

FOREIGN PATENT DOCUMENTS

| | | |
|---|---|---|
| CN | 1925562 A | 3/2007 |
| CN | 101188677 A | 5/2008 |

(Continued)

OTHER PUBLICATIONS

Color Wheel Hue, Tint, Shade & Tone, Color-Wheel-Artist.com, Jun. 15, 2011, downloaded from Internet Archive on Apr. 30, 2015, pp. 1-4.*

(Continued)

*Primary Examiner* — Jeffery A Brier
(74) *Attorney, Agent, or Firm* — Oblon, McClelland, Maier & Neustadt, L.L.P.

(57) ABSTRACT

An object display device includes an image capturing unit for acquiring an image in real space, an image feature extraction unit for extracting a predetermined feature about an image either in a plurality of feature regions detected from the image in real space or in the entire image in real space, an image processing unit for performing correction processing on an image of an object based on the predetermined feature about the image, and a display unit for displaying an overlaid image in which the image of the object subjected to correction processing is overlaid on the image in real space. With this configuration, the feature of the image in real space is appropriately reflected in the image of the object in the overlaid image.

9 Claims, 20 Drawing Sheets

(56) References Cited

U.S. PATENT DOCUMENTS

| 8,385,607 B2 | 2/2013 | Okada | |
|---|---|---|---|
| 2008/0218515 A1* | 9/2008 | Fukushima et al. | 345/424 |
| 2009/0232354 A1* | 9/2009 | Camp et al. | 382/103 |
| 2011/0304611 A1* | 12/2011 | Suzuki | 345/419 |
| 2012/0075484 A1* | 3/2012 | Kawamoto et al. | 348/207.1 |
| 2013/0141434 A1* | 6/2013 | Sugden et al. | 345/426 |
| 2013/0257908 A1* | 10/2013 | Ota et al. | 345/633 |

FOREIGN PATENT DOCUMENTS

| JP | 2010 170316 | 8/2010 |
|---|---|---|
| JP | 2012 69074 | 4/2012 |

OTHER PUBLICATIONS

International Search Report Issued Oct. 2, 2012 in PCT/JP12/66770 Filed Jun. 29, 2012.

International Preliminary Report on Patentability and Written Opinion issued Jan. 23, 2014 in PCT/JP2012/066770 (submitting English translation only).

Office Action issued Apr. 9, 2013, in Japanese Patent Application No. 2011-156053 with English translation.

Combined Chinese Office Action and Search Report issued Feb. 17, 2015 in Patent Application No. 201280007245.6 (with English language translation).

The Partial Supplementary European Search Report issued Aug. 20, 2015, in Patent Application No. 12811842.9.

Chia-Hu Chang, et al., "Virtual spotlighted advertising for tennis videos", Journal of Visual Communication and Image Representation, vol. 21, No. 7, XP 027247119, Oct. 1, 2010, pp. 595-612.

Daniel Cohen-Or, et al., "Color Harmonization", ACM Siggraph, XP 055075986, Jan. 1, 2006, pp. 624-630.

Lukas Gruber, et al., "Color Harmonization for Augmented Reality", Mixed and Augmented Reality (ISMAR), XP 032291054, Oct. 13, 2010, pp. 227-228.

Extended European Search Report issued Jan. 14, 2016 in Patent Application No. 12811842.9.

Jan Fischer, et al. "Enhanced visual realism by incorporation camera image effects" Mixed and Augmented Reality (ISMAR), XP031014671, Oct. 1, 2006, pp. 205-208.

Georg Klein, et al. "Simulating low-cost cameras for augmented reality compositing" I EEE Transactions on Visualization and Computer Graphics, vol. 16, No. 3, XP011344620, May 1, 2010, pp. 369-380.

* cited by examiner

Fig.6
| No | FEATURE SUBSTANCE DATA | COLOR TONE(RGB) |
|---|---|---|
| 0001 |  | $(r_1, g_1, b_1)$ |
| 0002 | 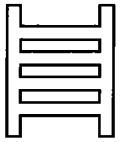 | $(r_2, g_2, b_2)$ |
| 0003 |  | $(r_3, g_3, b_3)$ |
| 0004 | ... | ... |

Fig.7

| No | R | G | B |
|---|---|---|---|
| 1 | 100% | 0% | 0% |
| 2 | 50% | 0% | 0% |
| 3 | 100% | 50% | 50% |
| 4 | 100% | 50% | 0% |
| 5 | 100% | 100% | 0% |
| 6 | 50% | 50% | 0% |
| 7 | 50% | 100% | 0% |
| 8 | 0% | 100% | 0% |
| 9 | 50% | 100% | 50% |
| 10 | 0% | 50% | 0% |
| 11 | 0% | 100% | 50% |
| 12 | 0% | 100% | 100% |
| 13 | 0% | 50% | 50% |
| 14 | 0% | 50% | 100% |
| 15 | 0% | 0% | 100% |
| 16 | 50% | 50% | 100% |
| 17 | 0% | 0% | 50% |
| 18 | 50% | 0% | 100% |
| 19 | 50% | 0% | 50% |
| 20 | 100% | 0% | 100% |
| 21 | 100% | 0% | 50% |

Fig.8
| ID | VIRTUAL OBJECT DATA | OVERLAY POSITION |
|---|---|---|
| 0001 |  | $(x_1, y_1)$ |
| 0002 |  | $(x_2, y_2)$ |
| 0003 |  | $(x_3, y_3)$ |

Fig.9
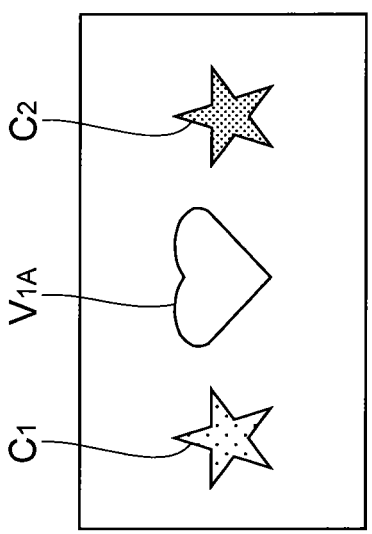
(b)
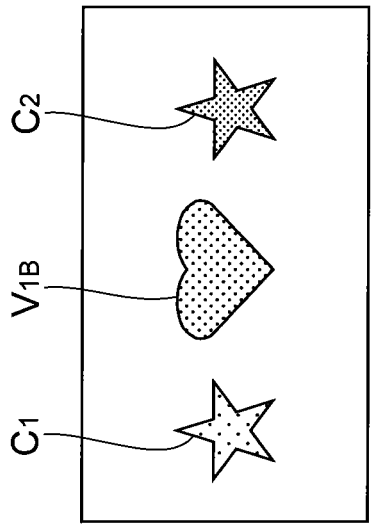
(a)

Fig.10
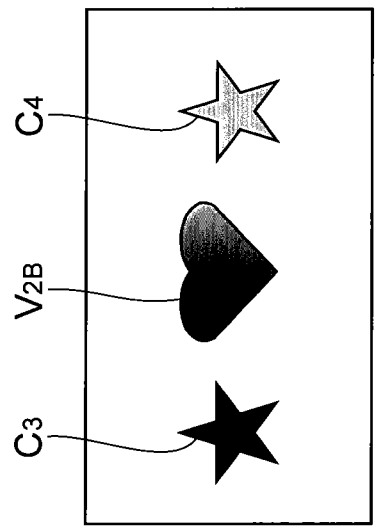
(b)
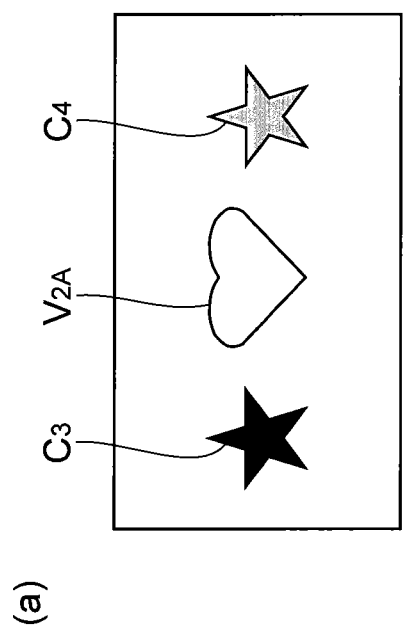
(a)

Fig.11
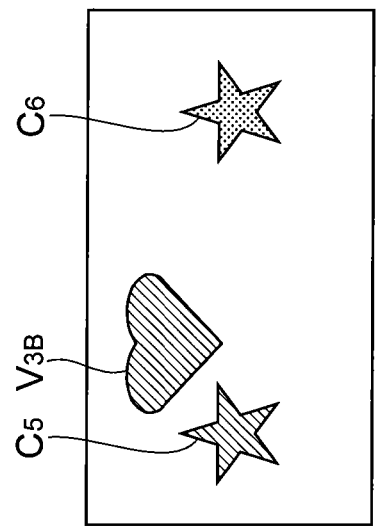
(b)
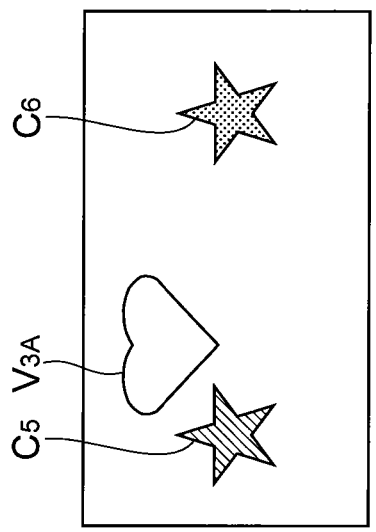
(a)

*Fig.13*
(a)
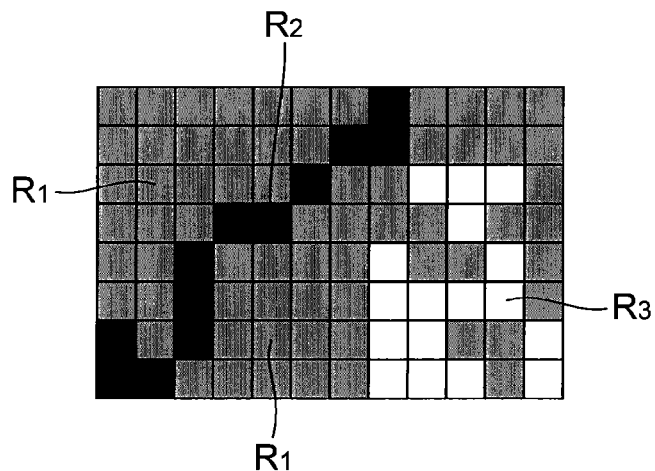
(b)
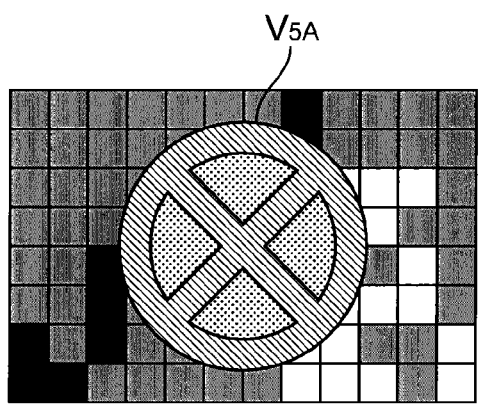
(c)
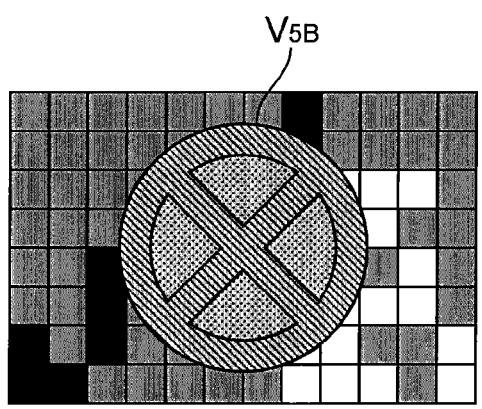

Fig.14
(a)
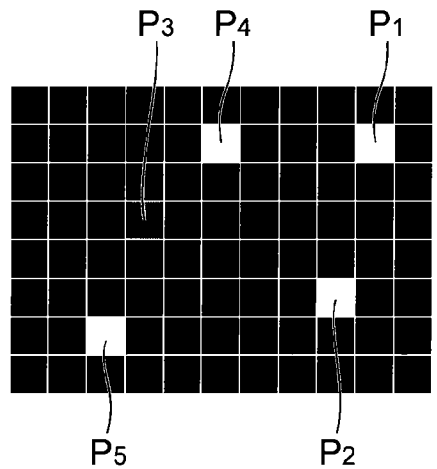
(b)
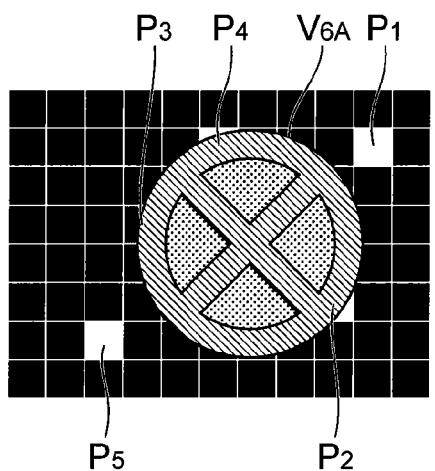
(c)
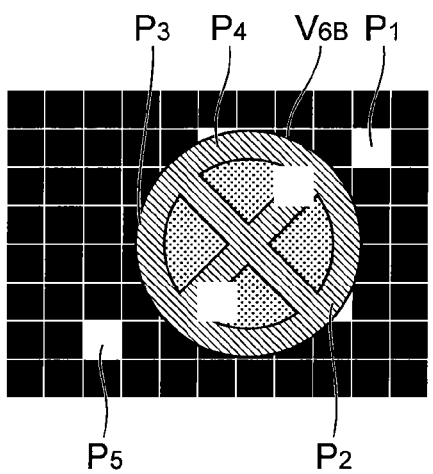

APPARATUS AND METHOD FOR DISPLAYING OBJECTS

TECHNICAL FIELD

The present invention relates to an object display device, an object display method, and an object display program.

BACKGROUND ART

In recent years, services based on AR (Augmented Reality) technology have been developed and provided. For example, a technique is known in which an object arranged around the location of a mobile terminal is acquired, and the object including a variety of information and images is overlaid and displayed on an image in real space acquired by a camera provided to the mobile terminal. Another technique is also known in which a predetermined marker is detected from an image in real space acquired by a camera in a mobile terminal, and an object associated with the marker is overlaid on the image in real space and displayed on a display. In addition, a technique for correcting the color tone of an object based on the color tone of a marker arranged in real space is known as a technique for considering the color tone of an object in an image in real space when the object is overlaid on the image in real space (see, for example, Patent Literature 1).

CITATION LIST

Patent Literature

[Patent Literature 1] Japanese Patent Application Laid-Open Publication No. 2010-170316

SUMMARY OF INVENTION

Technical Problem

In order to reduce a sense of incongruity about an object in an overlaid image in which the object is overlaid on an image in real space, a feature of the image in real space is preferably reflected in the image of the object. The conventional technique disclosed in Patent Literature 1, however, corrects the color tone of the object based on the color tone of a single marker arranged in real space, so that a single limited region in the image represents the feature of the image in real space. Since the color tone of the marker does not always represent the feature of the image in real space, the conventional technique as described above may not appropriately correct the image of the object and may cause a sense of incongruity in the overlaid image.

The present invention is made in view of the above-mentioned problem. An object of the present invention is to provide an object display device, an object display method, and an object display program which can reduce a sense of incongruity about an image of an object in an overlaid image in which the object is overlaid and displayed on an image in real space, in AR technology.

Solution to Problem

In order to solve the above-mentioned problem, an object display device according to an embodiment of the present invention overlays and displays an object on an image in real space. The object display device includes image capturing means for acquiring an image in real space, image feature extraction means for extracting a predetermined feature about an image either in a plurality of predetermined feature regions detected from the image in real space acquired by the image capturing means or in the entire image in real space, image processing means for performing correction processing on an image of the object based on the predetermined feature extracted by the image feature extraction means, and display means for displaying an overlaid image in which the image of the object subjected to correction processing by the image processing means is overlaid on the image in real space.

In order to solve the above-mentioned problem, an object display method according to an embodiment of the present invention is performed in an object display device that overlays and displays an object on an image in real space. The object display method includes an image capturing step of acquiring an image in real space, an image feature extraction step of extracting a predetermined feature about an image either in a plurality of feature regions detected from the image in real space acquired in the image capturing step or in the entire image in real space, an image processing step of performing correction processing on an image of the object based on the predetermined feature extracted in the image feature extraction step, and a display step of displaying an overlaid image in which the image of the object subjected to correction processing in the image processing step is overlaid on the image in real space.

In order to solve the above-mentioned problem, an object display program according to an embodiment of the present invention allows a computer to function as an object display device that overlays and displays an object on an image in real space. The object display program allows the computer to implement an image capturing function of acquiring an image in real space, an image feature extraction function of extracting a predetermined feature about an image either in a plurality of feature regions detected from the image in real space acquired by the image capturing function or in the entire image in real space, an image processing function of performing correction processing on an image of the object based on the predetermined feature extracted by the image feature extraction function, and a display function of displaying an overlaid image in which the image of the object subjected to correction processing by the image processing function is overlaid on the image in real space.

In the object display device, the object display method, and the object display program in the foregoing aspect, an image of an object is subjected to correction processing based on a predetermined feature about an image that is extracted from a plurality of feature regions detected from an image in real space or the entire image in real space, so that the feature of the image in real space is appropriately reflected in the image of the object. This reduces a sense of incongruity about the image of the object in the overlaid image in which the object is overlaid and displayed on the image in real space.

In the object display device according to another aspect, the image feature extraction means may extract a predetermined feature from the entire image in real space in the case that the feature regions are not detected.

According to the foregoing aspect, detection of a predetermined feature region is first attempted, and a feature to be used to correct the image of the object is then extracted from the image of the detected feature region. This facilitates extraction of a feature to be used to correct the image of the object. Even when a feature region is not detected, a predetermined feature extracted from the image in real space is used to correct the image of the object, thereby allowing appropriate correction of the image of the object.

The object display device according to yet another aspect may further include feature region information storage means for storing feature region information at least about color tones of the feature regions in association with the feature regions. The image feature extraction means may extract amounts of change in color tones of the feature regions in the image in real space with respect to the color tones stored in the feature region information storage means. The image processing means may perform correction processing on the image of the object based on the amounts of change in the color tones that are extracted by the image feature extraction means.

According to the foregoing aspect, the color tone of the image of the object is corrected based on the amounts of change in color tones of the feature regions in the image in real space with respect to the color tones stored in advance for the detected feature regions. Accordingly, the color tone of the image in real space is appropriately reflected in the image of the object.

In the object display device according to yet another aspect, the image processing means performs correction processing on the image of the object in accordance with an overlay position of the object with respect to positions of the feature regions in the image in real space.

According to the foregoing aspect, the degree of reflection of the amounts of change in color tones of the feature regions in the color tone of the object is considered in accordance with the positional relationship between the feature regions and the object. Accordingly, the color tone of the object is more appropriately corrected, thereby further reducing a sense of incongruity.

In the object display device according to yet another aspect, the image feature extraction means may extract a feature about a color tone of the entire image in real space, and the image processing means may perform correction processing based on the feature about the color tone of the entire image in real space that is extracted by the image feature extraction means.

According to the foregoing aspect, the color tone of the entire image in real space is reflected in the color tone of the object, thereby reducing a sense of incongruity about the object in the overlaid image.

In the object display device according to yet another aspect, the image feature extraction means may extract a feature about noise distribution in the image in real space, and the image processing means may perform correction processing based on the feature about noise distribution that is extracted by the image feature extraction means.

In the case where the image in real space includes noise, overlaying an image of an object without noise causes a sense of incongruity in the overlaid image. According to the foregoing aspect, the feature about noise distribution in the image in real space is reflected in the image of the object, thereby reducing a sense of incongruity in the overlaid image.

Advantageous Effects of Invention

According to an aspect of the present invention, in AR technology, a sense of incongruity about an image of an object can be reduced in an overlaid image in which the object is overlaid and displayed on an image in real space.

BRIEF DESCRIPTION OF DRAWINGS

FIG. 6 is a diagram showing a configuration of a feature region information storage unit and an example of data stored therein.

FIG. 7 is a diagram showing an example of a color tone table for extracting the amount of change in color tone of a feature region in a color tone change amount measuring unit.

FIG. 8 is a diagram showing a configuration of a virtual object storage unit and an example of data stored therein.

FIG. 9 is a diagram showing an example of correction processing on the color tone of an object based on the amounts of change in color tone of feature regions.

FIG. 10 is a diagram showing an example of correction processing on the color tone of an object based on the amounts of change in color tone of feature regions.

FIG. 11 is a diagram showing an example of correction processing on the color tone of an object based on the amounts of change in color tone of feature regions.

FIG. 13 is a diagram showing an example of correction processing based on the color tone of the entire image in real space.

FIG. 14 is a diagram showing an example of correction processing based on noise distribution in the entire image in real space.

DESCRIPTION OF EMBODIMENTS

An embodiment of an object display device, an object display method, and an object display program according to the present invention will be described with reference to the figures. It is noted that the same parts are denoted with the same reference signs, if possible, and an overlapping description is omitted.

Figure 1:
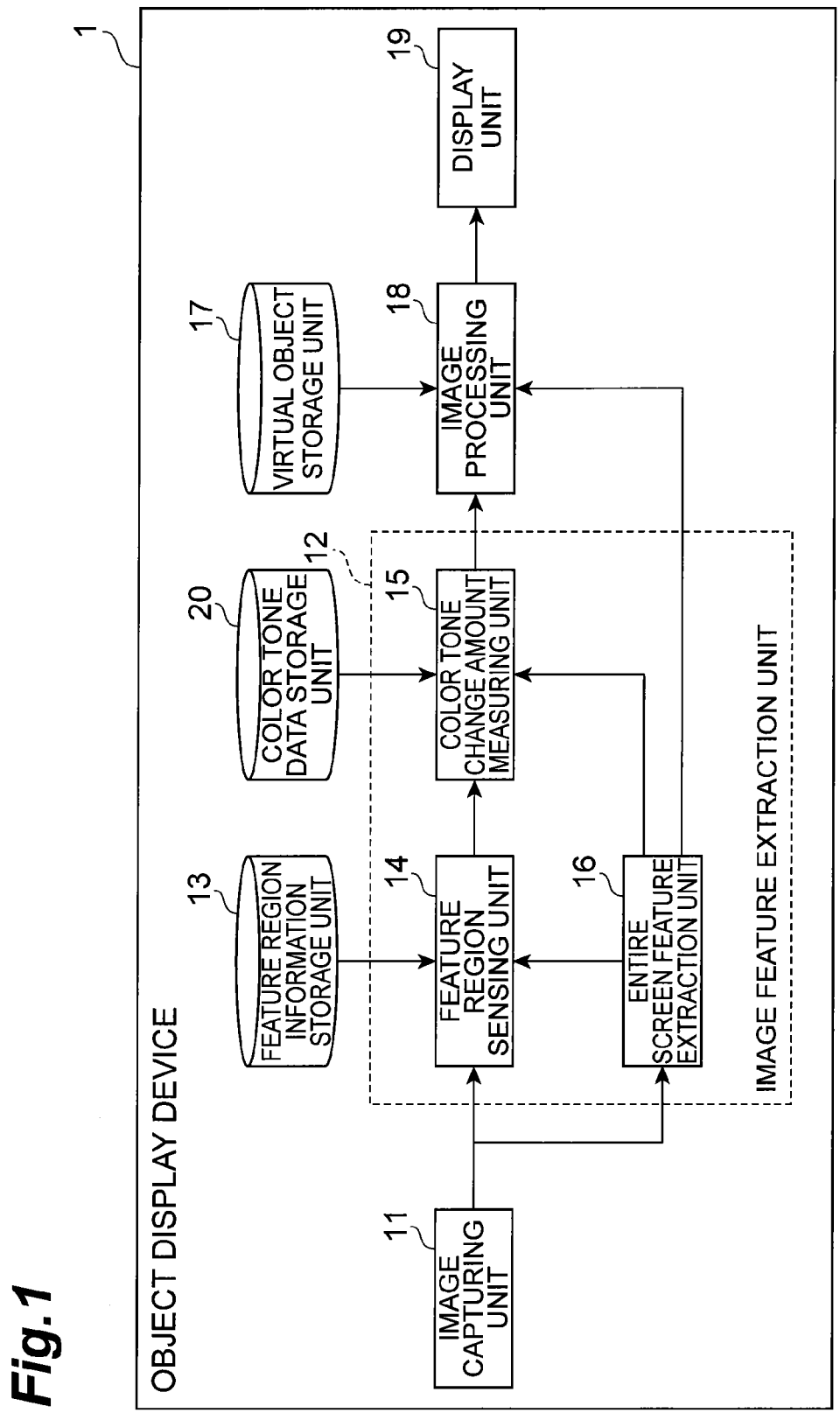
FIG. 1 is a block diagram showing a functional configuration of an object display device.

FIG. 1 is a block diagram showing a functional configuration of an object display device 1. The object display device 1 in the present embodiment is a device that overlays and displays an object on an image in real space, and is, for example, a portable terminal capable of communication via a mobile communication network.

Services based on AR technology using devices such as mobile terminals include the one detecting a predetermined marker from an image in real space acquired by a camera in a mobile terminal and overlaying an object associated with the marker on the image in real space to display the overlaid object on a display. The marker may be a substance artificially provided in real space in advance or may be a structure such as a building or a signboard, or a logo mark existing in real space. Similar services include the one acquiring an object arranged around the location of a mobile terminal based on information of the position where the mobile terminal is located, and overlaying and displaying the object associated with the position in the image in real space acquired by a camera provided to the mobile terminal. Both manners of services using AR technology as described above are assumed in the object display device 1 in the present embodiment.

As shown in FIG. 1, the object display device 1 functionally includes an image capturing unit 11 (image capturing means), an image feature extraction unit 12 (image feature extraction means), a feature region information storage unit 13 (feature region information storage means), a virtual object storage unit 17 (virtual object storage means), an image processing unit 18 (image processing means), a display unit 19 (display means), and a color tone data storage unit 20. The image feature extraction unit 12 includes a feature region sensing unit 14, a color tone change amount measuring unit 15, and an entire screen feature extraction unit 16.

Figure 2:
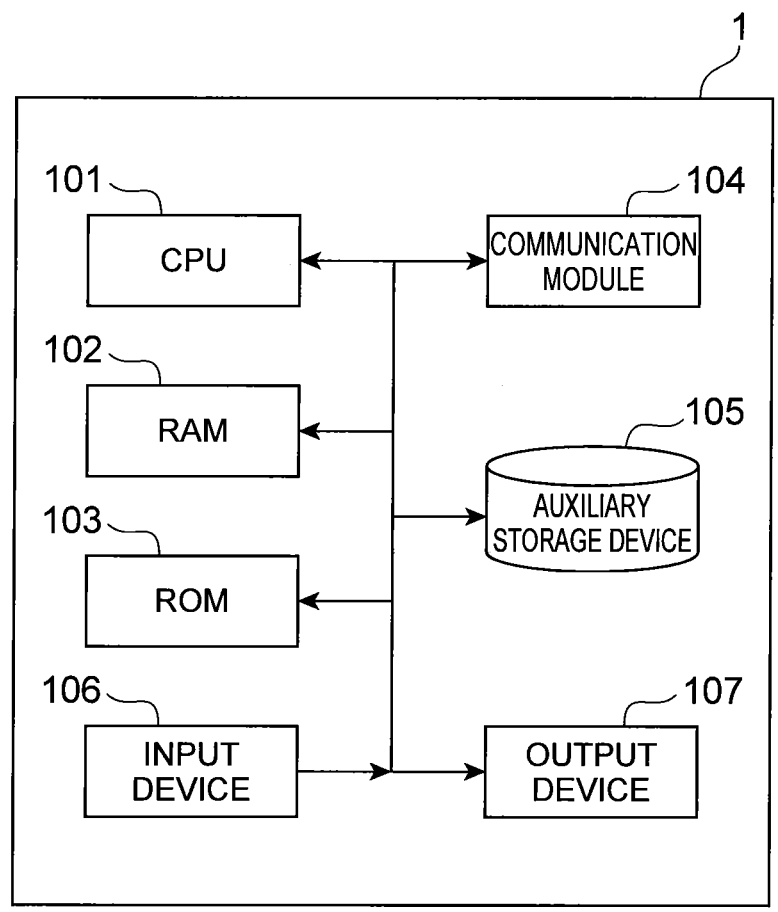
FIG. 2 is a hardware block diagram of the object display device.

FIG. 2 is a hardware configuration diagram of the object display device 1. As shown in FIG. 2, the object display device 1 is physically configured as a computer system mainly including a CPU 101, a RAM 102 and a ROM 103 as main storages, a communication module 104 that is a data transmission/reception device, an auxiliary storage device 105 such as a hard disk or a flash memory, an input device 106 such as a keyboard as an input device, and an output device 107 such as a display. Each function shown in FIG. 1 is implemented by reading predetermined computer software on the hardware such as the CPU 101 and the RAM 102 shown in FIG. 2 to bring the communication module 104, the input device 106, and the output device 107 into operation under the control of the CPU 101, and by reading and writing data from/into the RAM 102 or the auxiliary storage device 105. Referring to FIG. 1 again, each functional unit of the object display device 1 will be described in details.

Figure 3:
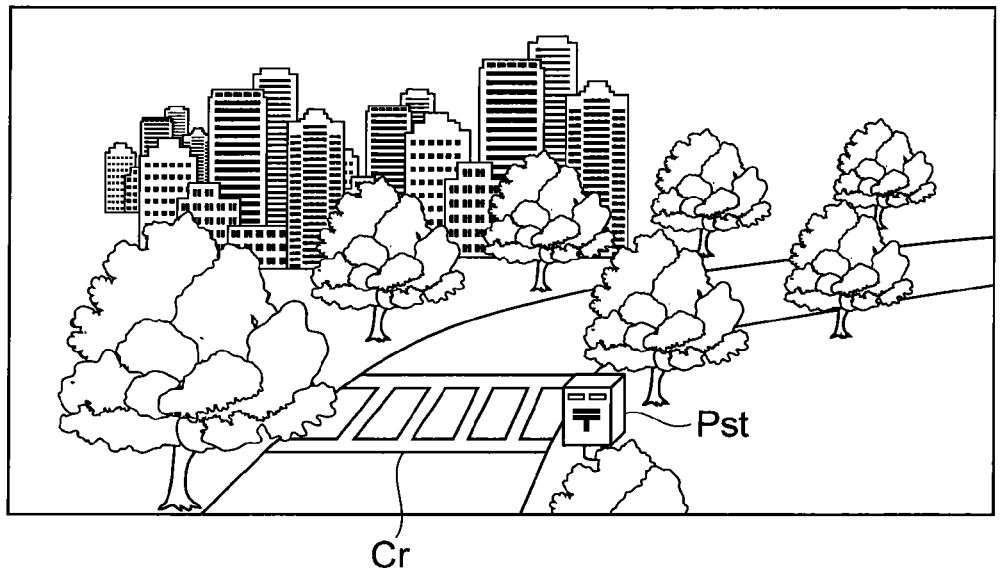
FIG. 3 is a diagram showing an example of an image in real space acquired by an image capturing unit.
Figure 4:
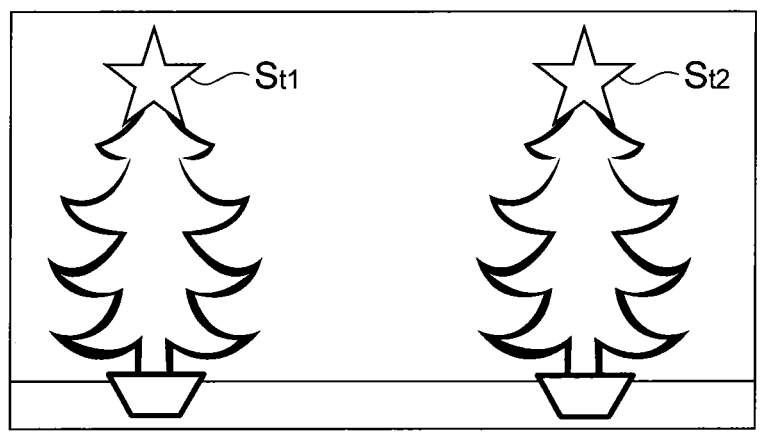
FIG. 4 is a diagram showing an example of an image in real space acquired by the image capturing unit.
Figure 5:
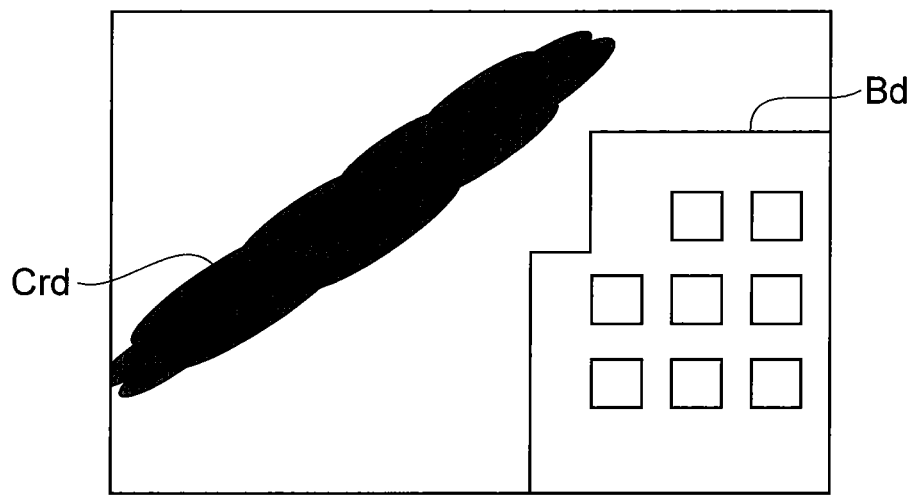
FIG. 5 is a diagram showing an example of an image in real space acquired by the image capturing unit.

The image capturing unit 11 is a unit that acquires an image in real space and includes, for example, a camera. FIG. 3 to FIG. 5 are diagrams showing examples of an image in real space acquired by the image capturing unit 11. The image in real space shown in FIG. 3 includes images of a crosswalk $C_r$ and a post $P_{st}$ as feature substances extracted later by the image feature extraction unit 12. The image in real space shown in FIG. 4 includes images of star-shaped objects $S_{t1}$ and $S_{t2}$ as feature substances extracted later by the image feature extraction unit 12. The image in real space shown in FIG. 5 includes images of cloud $C_{rd}$ and a building $B_d$ extracted later by the image feature extraction unit 12 as elements constituting the color tone of the entire image. The image capturing unit 11 sends the acquired image in real space to the image feature extraction unit 12.

The image feature extraction unit 12 is a unit that extracts a predetermined feature about an image in a plurality of predetermined feature regions detected from the image in real space acquired by the image capturing unit 11 or the entire image in real space. Each of the predetermined feature regions is a region that is referred to in order to extract a feature of the image in real space. The image feature extraction unit 12 includes the feature region sensing unit 14, the color tone change amount measuring unit 15, and the entire screen feature extraction unit 16, as functional units for extracting a feature about an image. The feature region information storage unit 13 is also used to extract a feature about an image.

The feature region information storage unit 13 is a unit that stores feature region information at least about the color tone of a feature region in association with the feature region. The feature region information storage unit 13 includes two dimensional (2D) or three dimensional (3D) data representing the shape of a feature region for detecting (matching) the feature region from an image in real space. In the present embodiment, the feature region information storage unit 13 includes feature substance data as data representing a feature region. FIG. 6 is a diagram showing a configuration of the feature region information storage unit 13 and an example of data stored therein.

As shown in FIG. 6, the feature region information storage unit 13 stores feature substance data and data of color tone that are associated with "No." uniquely identifying a feature region. The feature substance data is 2D or 3D data representing the shape of the feature substance as described above and is used for detection (matching) of the feature substance from the image in real space by the feature region sensing unit 14. The data of color tone is data representing the color of the main portion of the feature substance and is represented, for example, in the RGB format. Referring to FIG. 6, the feature region information storage unit 13 stores 3D data representing a post as feature substance data, and data ($r_1$, $g_1$, $b_1$) indicating the color tone of the red portion that is the main portion of the post, in association with No. "0001". The feature region information storage unit 13 also stores 2D data representing a crosswalk as feature substance data, and data ($r_2$, $g_2$, $b_2$) indicating the color tone of the white portion that is the main portion of the crosswalk, in association with No. "0002". In addition, the feature region information storage unit 13 stores 2D data representing a star-shaped object as feature substance data, and data ($r_3$, $g_3$, $b_3$) indicating the color tone of the star-shaped object, in association with No. "0003".

The color tone data storage unit 20 is a unit that stores color tone data to be used to measure the amount of change in color tone. The color tone data storage unit 20 stores, for example, a color tone table shown in FIG. 7. As shown in FIG. 7, the color tone table defines a color tone by the proportion of each tone of the R value, the G value, and the B value to the maximum value thereof, in association with "No." uniquely identifying a record. The color tone change amount measuring unit 15 measures the amount of change in color tone based on the data stored in the color tone data storage unit 20. The detailed processing by the color tone change amount measuring unit 15 will be described later.

The virtual object storage unit 17 is a unit that stores virtual object information about a virtual object in advance or temporarily. In the case where the object display device 1 is a device that displays an object associated with a marker detected from an image in real space, the virtual object information includes, for example, object data associated with the marker. In the case where the object display device 1 is a device that displays an object associated with a location in real space, the virtual object information includes, for example, object data associated with position information.

FIG. 8 is a diagram showing an example of the virtual object information stored in the virtual object storage unit 17. As shown in FIG. 8, the virtual object storage unit 17 stores virtual object data and an overlay position that are associated with an ID identifying a virtual object. The virtual object data is data representing the shape and color of the virtual object. The overlay position is data indicating the position where the virtual object is overlaid and displayed, and represents the absolute position in real space or the relative position to the marker (feature substance).

The virtual object information may be stored in the virtual object storage unit 17 in advance or may be acquired through predetermined communication means from a not-shown server. In the case where the virtual object information is acquired from the server, the virtual object information may be provided from the server based on position information indicating the location of the object display device 1. The object data is, for example, image data of an object or data of a 3D object for representing the object. The position where an object is overlaid and displayed in an image in real space is defined, for example, by position information associated with the object data in the virtual object information or the relative position to the marker in the image in real space.

The image processing unit 18 is a unit that generates an overlaid image by acquiring a virtual object from the virtual object storage unit 17 and overlaying the acquired virtual object on the image in real space acquired by the image capturing unit 11. The overlay position of the virtual object in the overlaid image is decided, for example, based on the position information associated with the virtual object or the relative position of the marker in the image in real space. The image processing unit 18 sends the generated overlaid image to the display unit 19.

In addition, the image processing unit 18 performs correction processing on the image of the object based on a predetermined feature about the image in real space that is extracted by the image feature extraction unit 12. The specific processing will be described in details later.

The display unit 19 is a unit that displays the overlaid image generated and sent by the image processing unit 18 and includes, for example, a device such as a display. The overlaid image is an image in which the image of the object corrected by the image processing unit 18 is overlaid on the image in real space. The detailed functions of the image feature extraction unit 12 and the image processing unit 18 are described below.

The feature region sensing unit 14 is a unit that detects a predetermined feature region from the image in real space acquired by the image capturing unit 11. Specifically, the feature region sensing unit 14 extracts a feature substance from the image in real space by searching the image in real space based on the feature substance data stored in the feature region information storage unit 13.

Taking the image in real space shown in FIG. 3 as an example, the feature region sensing unit 14 searches the image in real space based on the feature substance data stored in the feature region information storage unit 13 shown in FIG. 6. The feature region sensing unit 14 then extracts the post $P_{st}$ and the crosswalk $C_r$ corresponding to the feature substances shown by No. "0001" and No. "0002", respectively. When searching the image in real space shown in FIG. 4, the feature region sensing unit 14 extracts the star-shaped objects corresponding to the feature substance shown by No. "0003". The region in which a feature substance is represented in an image in real space forms a feature region. If a feature substance is extracted, the feature region sensing unit 14 acquires information (for example, coordinates in the image in real space) representing the position of the feature substance in the image in real space and sends the acquired information to the color tone change amount measuring unit 15. If a feature substance fails to be extracted, the feature region sensing unit 14 may give a notification to that effect to the entire screen feature extraction unit 16. The function of the entire screen feature extraction unit 16 will be described later.

The color tone change amount measuring unit 15 is a unit that extracts the amount of change in color tone for the feature substance extracted by the feature region sensing unit 14 with respect to the feature substance stored in the feature region information storage unit 13. Specifically, for example, in the case where the color tone of the feature substance is represented in the RGB format, the color tone change amount measuring unit 15 calculates the respective differences (the amount of change in color tone of the feature substance) between the R value, the G value, and the B value of the feature substance stored in the feature region information storage unit 13, and the R value, the G value, and the B value of the feature substance extracted by the feature region sensing unit 14.

The color tone change amount measuring unit 15 extracts a record having a value closest to the amount of change in color tone (RGB) of the feature substance extracted by the feature region sensing unit 14 with respect to the color tone (RGB) of the feature substance stored in the feature region information storage unit 13, from the color tone table, and sets the extracted record as the amount of change in color tone of the feature substance.

The color tone change amount measuring unit 15 sends information indicating the position of the feature substance in the image in real space that is acquired from the feature region sensing unit 14 as well as information of the amount of change in color tone of the feature substance to the image processing unit 18.

The image processing unit 18 performs correction processing on the image of the object based on the predetermined feature about the image in real space that is extracted by the image feature extraction unit 12. Specifically, the image processing unit 18 performs correction processing on the image of the object acquired from the virtual object storage unit based on the amounts of change in color tone of a plurality of feature substances extracted by the feature region sensing unit 14 and the color tone change amount measuring unit 15. The image processing unit compares the display position of the object with the information indicating the position of the feature substance that is received from the color tone change amount measuring unit, and determines whether they are within a predetermined distance. The image processing unit also compares the amounts of change in color tone of the feature substances that are received from the color tone change amount measuring unit, and determines whether the difference in the amounts of change is smaller than a predetermined amount. Referring to FIG. 9 to FIG. 12, examples of the object correction processing based on the amounts of change in color tone of a plurality of feature substances are described.

FIG. 9 is a diagram showing an example of correction processing on an object $V_{1A}$ in the case where the difference in the amounts of change in color tone of feature substances $C_1$ and $C_2$ is smaller than a predetermined amount. When the difference in the amounts of change in color tone of a plurality of feature substances is smaller than a predetermined amount and the object that is the target of correction processing is located within a predetermined distance from the plurality of feature substances, the image processing unit 18 performs correction of color tone on the object based on the average of the amounts of change in color tone of the plurality of feature substances.

The correction of color tone is implemented by generating a conversion parameter for each value of RGB based on the average amount of change in color tone represented in the RGB format and performing predetermined calculation processing on the RGB value for each pixel representing the object with the conversion parameter. A variety of well-known techniques such as color tone correction processing and filter processing can be applied in this correction processing, which is applicable to the examples illustrated below with reference to FIGS. 7 and 8.

In the example shown in FIG. 9(*a*), for example, the amount of change in color tone of the feature substance $C_1$ corresponds to No. 1 in the color tone table shown in FIG. 4, and the amount of change in color tone of the feature substance $C_2$ corresponds to No. 2 in the color tone table. In this case, the difference between the amount of change in color tone of the feature substance $C_1$ and the amount of change in color tone of the feature substance $C_2$ is smaller than a predetermined amount, so that the image processing unit 18 generates a conversion parameter based on the average of the amount of change in color tone of the feature substance $C_1$ and the amount of change in color tone of the feature substance $C_2$. As shown in FIG. 9(*b*), the image processing unit 18 uses the generated conversion parameter to perform color tone correction processing on the object $V_{1A}$ to generate the image of an object $V_{1B}$ with the corrected color tone.

FIG. 10 is a diagram showing an example of correction processing on an object $V_{2A}$ in the case where the respective components of color (RGB) in the amounts of change in color tone of feature substances $C_3$ and $C_4$ are similar but the gray scales thereof are different. When the differences of components in the amounts of change in color tone of a plurality of feature substances are similar and smaller than a predetermined amount, and the object that is the target of correction processing is located within a predetermined distance from the plurality of feature substances, the image processing unit 18 performs gradation processing on the object based on the relative position of the object to the plurality of feature substances. When the components of a plurality of color tones are similar, the plurality of color tones belong to similar colors and are different in gray scale. The image processing unit 18 may focus on the values of R, G, and B and, for example, treat those having the R value of 0% as similar colors, although not being limited thereto.

In the example shown in FIG. 10(*a*), it is assumed that, for example, the amount of change in color tone of the feature substance $C_3$ corresponds to No. 1 in the color table shown in FIG. 4, and the amount of change in color tone of the feature substance $C_4$ corresponds to No. 4 in the color tone table. In this case, the components of color in the amount of change in color tone of the feature substance $C_3$ and the amount of change in color tone of the feature substance $C_4$ are similar, and the amounts of change in color tone of those feature substances belong to similar colors, so that the image processing unit 18 performs gradation processing on the object $V_{2A}$ and generates an object $V_{2B}$ with the corrected color tone as shown in FIG. 10(*b*).

Specifically, the image processing unit 18 corrects the color tone of the portion of the object $V_{2A}$ closest to the feature substance $C_3$ with a first conversion parameter generated based on the amount of change in color tone of the feature substance $C_3$, and the image processing unit 18 corrects the color tone of the portion of the object $V_{2A}$ closest to the feature substance $C_4$ with a second conversion parameter generated based on the amount of change in color tone of the feature substance $C_4$. The image processing unit 18 then performs color tone correction processing on a region in the object $V_{2A}$ from the portion closest to the feature substance $C_3$ to the portion closest to the feature substance $C_4$, with the conversion parameter value being gradually changed from the first conversion parameter value to the second conversion parameter value in accordance with the distances from the feature substance $C_3$ and the feature substance $C_4$.

FIG. 11 is a diagram showing an example of correction processing on an object $V_{3A}$ in the case where the difference in the amounts of change in color tone of feature substances $C_5$ and $C_6$ is greater than a predetermined amount. When the amounts of change in color tone of feature substances $C_5$ and $C_6$ are significantly different from each other, for example, it is expected that a plurality of light sources different in color tone exist in the image in real space. When the difference in the amounts of change in color tone of a plurality of feature substances is greater than a predetermined amount, the image processing unit 18 performs correction of color tone on the object that is the target of color tone correction, based on the amount of change in color tone of the feature substance at a smaller distance from the object.

In the example shown in FIG. 11(*a*), for example, the amount of change in color tone of the feature substance $C_5$ corresponds to No. 1 in the color tone table shown in FIG. 4, and the amount of change in color tone of the feature substance $C_6$ corresponds to No. 15 in the color tone table. In this case, the difference between the amount of change in color tone of the feature substance $C_5$ and the amount of change in color tone of the feature substance $C_6$ is greater than a predetermined amount, and the position of the object $V_{3A}$ is nearer to the position of the feature substance $C_5$ and is equal to or smaller than a predetermined distance, so that the image processing unit 18 generates a conversion parameter based on the amount of change in color tone of the feature substance $C_5$. As shown in FIG. 11(*b*), the image processing unit 18 then uses the generated conversion parameter to perform color tone correction processing on the object $V_{3A}$ to generate the image of an object $V_{3B}$ with the corrected color tone.

Figure 12:
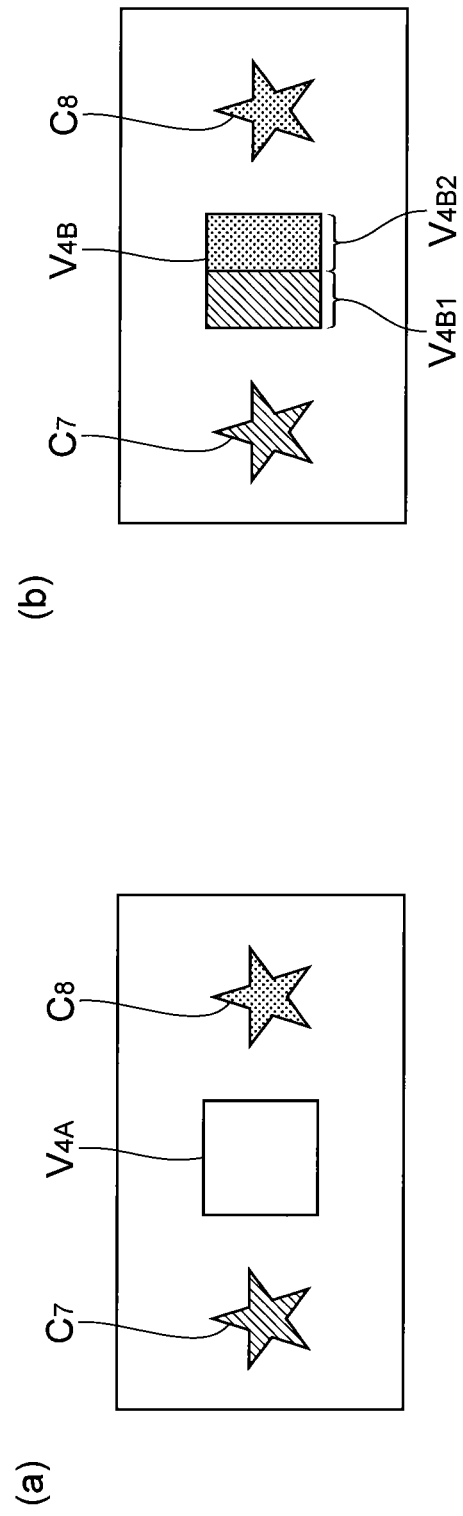
FIG. 12 is a diagram showing an example of correction processing on the color tone of an object based on the amounts of change in color tone of feature regions.

FIG. 12 is a diagram showing an example of correction processing on an object $V_4A$ in the case where the difference in the amounts of change in color tone of feature substances $C_7$ and $C_8$ is greater than a predetermined amount and the respective distances of the feature substances $C_7$ and $C_8$ from the object $V_4A$ are equivalent. In the example shown in FIG. 12(*a*), similar to the example shown in FIG. 11, for example, it is expected that a plurality of light sources different in color tone exist in the image in real space. In this case, as shown in FIG. 12(*b*), the image processing unit 18 may divide the object $V_{4A}$ into a first region $V_{4B1}$ closer to the position of the feature substance $C_7$ and a second region $V_{4B2}$ closer to the position of the feature substance $C_8$, correct the color tone of the first region $V_{4B1}$ with a conversion parameter generated based on the amount of change in color tone of the feature substance $C_7$, and correct the color tone of the second region $V_{4B2}$ with a conversion parameter generated based on the amount of change in color tone of the feature substance $C_8$.

The entire screen feature extraction unit 16 is a unit that extracts the feature (correction color information) about the color tone of the entire image in real space, as a correction color. Specifically, the entire screen feature extraction unit 16 extracts, for example, as the feature about the color tone of the entire image in real space, for example, a dominant color component in the entire image, the average color tone of the entire image, and noise distribution. The entire screen feature extraction unit 16 sends the extracted correction color to the image processing unit 18.

Referring to FIG. 13(*a*), the processing of extracting a dominant color component by the entire screen feature extraction unit 16 is described. FIG. 13(*a*) is a diagram schematically showing a distribution of color tones of an image in real space. The image shown in FIG. 13(*a*) is obtained by dividing the image in real space shown in FIG. 5 into unit regions having a predetermined size, and setting the value of the average color tone of pixels included in each region as the color tone of the region as a whole. In the image shown in FIG. 13(*a*), a region $R_1$ has a color tone derived from the background of the image shown in FIG. 5, a region $R_2$ has a color tone derived from the cloud $C_{rd}$, and a region $R_3$ has a color tone derived from the building $B_d$. The entire screen feature extraction unit 16 analyzes the image in real space shown in FIG. 13(a), extracts the color tone of the region $R_1$ as a dominant color component, and extracts the color tone of the region $R_1$ as a correction color for object correction processing. The processing of extracting a dominant color component from the image can be performed by well-known analysis techniques, for example, by dividing the entire image into unit regions for analyzing the color tones thereof.

As the processing of extracting the average color tone of the entire image, the entire screen feature extraction unit 16 calculates the average color tone of the entire image in real space based on the number of pixels in each of the region $R_1$, the region $R_2$, and the region $R_3$, and the RGB values indicating the color tone of the regions, and extracts the calculated average color tone as a correction color for object correction processing.

The entire screen feature extraction unit 16 also extracts the feature about a distribution of noise in the image in real space. Specifically, the entire screen feature extraction unit 16 detects noise in the image in real space and extracts noise distribution information including information such as the density of the detected noise.

Referring to FIG. 14(a), an example of the processing of extracting the feature about a distribution of noise in the entire image in real space by the entire screen feature extraction unit 16. FIG. 14(a) is a diagram schematically showing a distribution of noise in an image in real space.

The entire screen feature extraction unit 16 selects one pixel from the image in real space and, if the value representing the color of the one pixel differs by at least a predetermined amount from the average value of the values representing the colors of pixels surrounding the one pixel, determines the one pixel as noise. In the example shown in FIG. 14(a), the entire screen feature extraction unit 16 determines pixels $P_1$, $P_2$, $P_4$, and $P_5$ as noise. The color of the pixel $P_3$ differs from the color in the surrounding thereof but the difference is not equal to or greater than a predetermined amount, so that the entire screen feature extraction unit 16 does not determine the pixel $P_3$ as noise. The entire screen feature extraction unit 16 detects noise from the image in real space by such processing methods as illustrated and extracts the density of the noise as information about a distribution of noise. The entire screen feature extraction unit 16 then sends the extracted information about a distribution of noise to the image processing unit 18.

The entire screen feature extraction unit 16 sends the extracted information (correction color information) about the correction color for object correction processing to the image processing unit 18.

The image processing unit 18 performs correction processing on the image of the object based on the feature about the color tone of the entire image in real space that is extracted by the entire screen feature extraction unit 16. Specifically, the image processing unit 18 acquires correction color information about the correction color extracted from the color tone of the entire image in real space, from the entire screen feature extraction unit 16. The image processing unit 18 generates a conversion parameter for each value of RGB, for example, based on the correction color information represented in the RGB format. The image processing unit 18 then performs predetermined calculation processing on the RGB value for each pixel representing the object, with the conversion parameter. A variety of well-known techniques in color tone correction processing and filter processing can be applied in the generation of a conversion parameter and the calculation processing with the conversion parameter.

FIG. 13(b) is a diagram showing an example of an overlaid image in the case where correction processing by the image processing unit 18 is not performed. As shown in FIG. 13(b), an object $V_{5A}$ does not reflect the color tone of the entire image in real space, resulting in an overlaid image that causes a sense of incongruity. FIG. 13(c) is a diagram showing an example of an overlaid image in the case where the correction processing with a dominant color component in the entire image in real space is performed by the image processing unit 18. As shown in FIG. 13(c), the object $V_{5B}$ is subjected to the correction processing (multiplication processing) with a dominant color component in the entire image in real space, thereby reducing a sense of incongruity in the overlaid image.

The image processing unit 18 can further perform correction processing on the image of the object based on the feature about a distribution of noise in the image in real space that is extracted by the entire screen feature extraction unit 16. Specifically, the image processing unit 18 acquires noise distribution information including information, such as the density of noise, from the entire screen feature extraction unit 16. The image processing unit 18 then performs image processing of adding noise to the object that is the target of correction in accordance with the acquired noise distribution information. Noise is represented, for example, by overlaying a white spot having a predetermined size on the object. This image processing causes the object to have noise similar to that in the entire image in real space.

FIG. 14(b) is a diagram showing an example of an overlaid image in the case where correction processing is not performed by the image processing unit 18. As shown in FIG. 14(b), the object $V_{5A}$ does not reflect the state of noise occurring in the entire image in real space, resulting in an overlaid image that causes a sense of incongruity. By contrast, FIG. 14(c) is a diagram showing an example of an overlaid image in the case where correction processing with the noise distribution information is performed by the image processing unit 18. As shown in FIG. 13(c), the object $V_{5B}$ is subjected to correction processing of adding noise similar to the noise occurring in the entire image in real space, thereby reducing a sense of incongruity in the overlaid image.

The correction with noise distribution information may be performed together with the color tone correction with a dominant color component or with the color tone correction with the average color tone as described above.

As described above, the image processing unit 18 corrects the color tone of the object based on the correction color information acquired from the color tone change amount measuring unit 15 or the entire screen feature extraction unit 16 and sends an overlaid image to the display unit 19. The overlaid image is thus displayed on the display unit 19.

Figure 15:
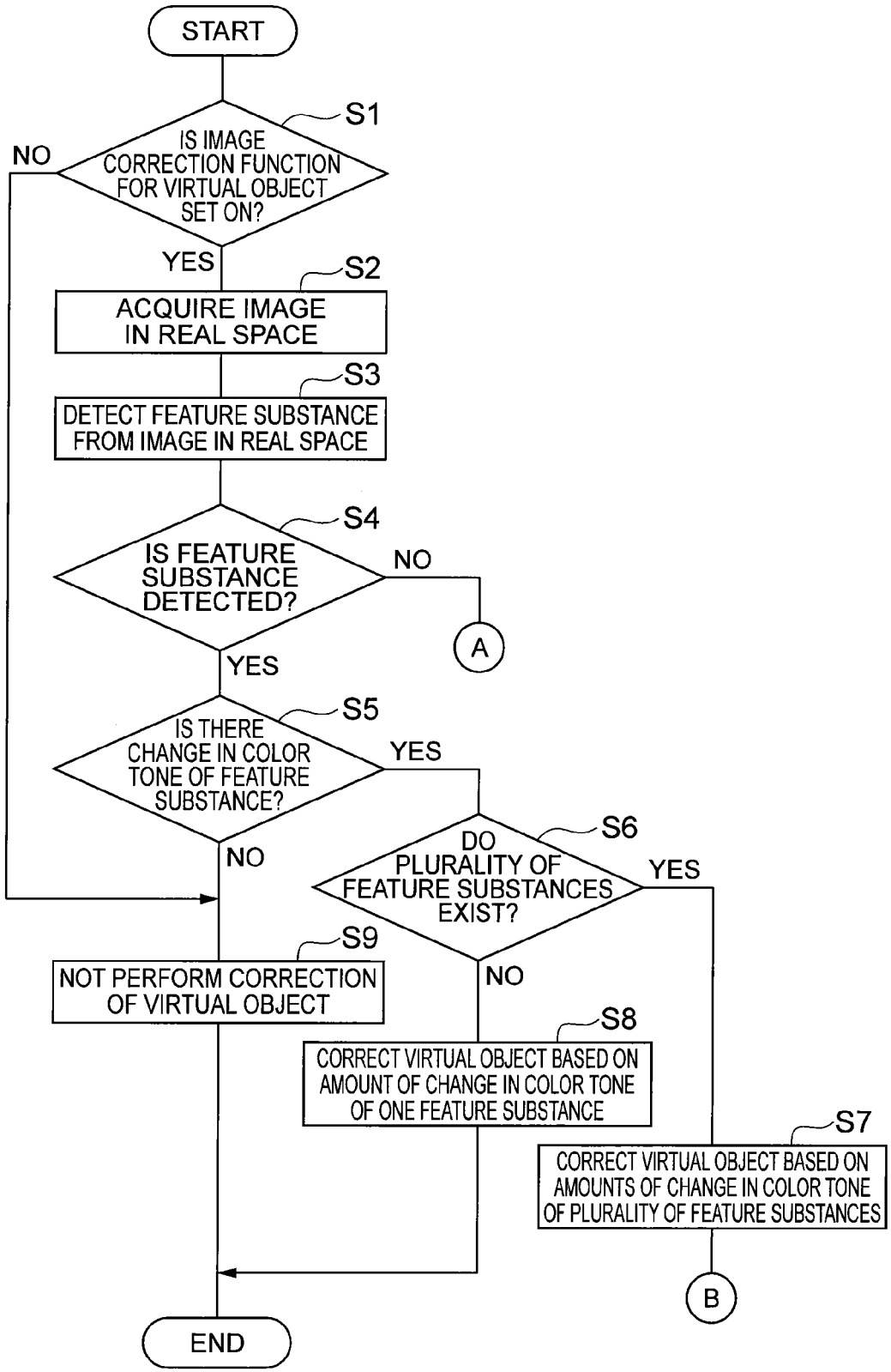
FIG. 15 is a flowchart showing processing of an object display method.
Figure 16:
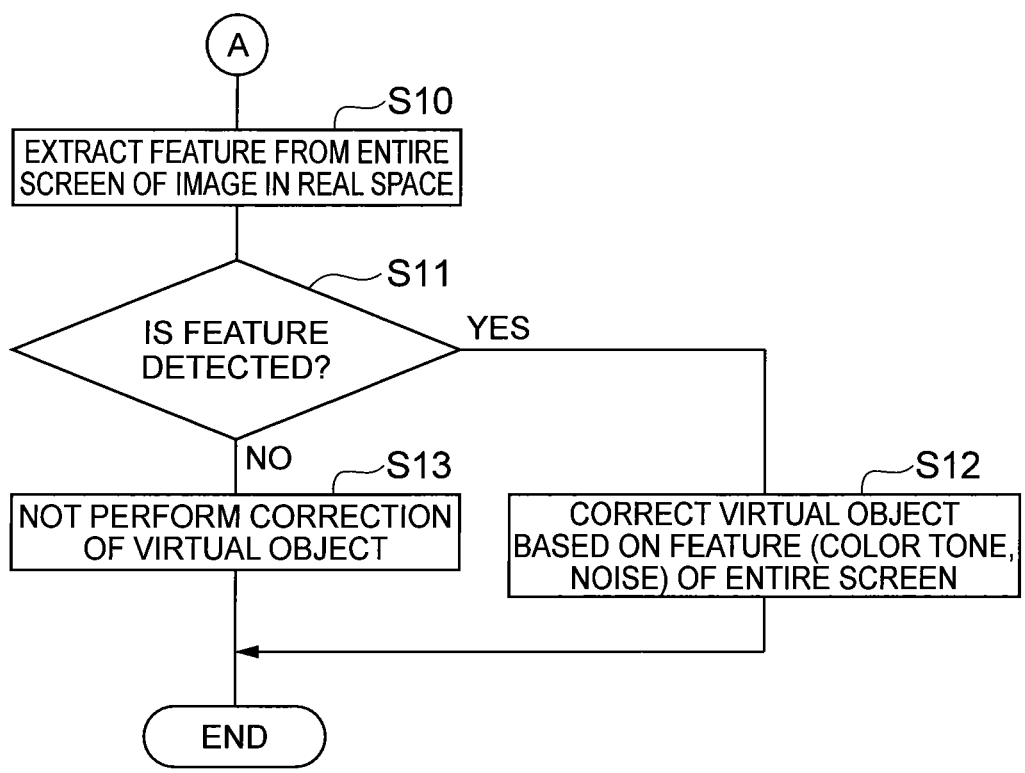
FIG. 16 is a flowchart showing processing of the object display method.
Figure 17:
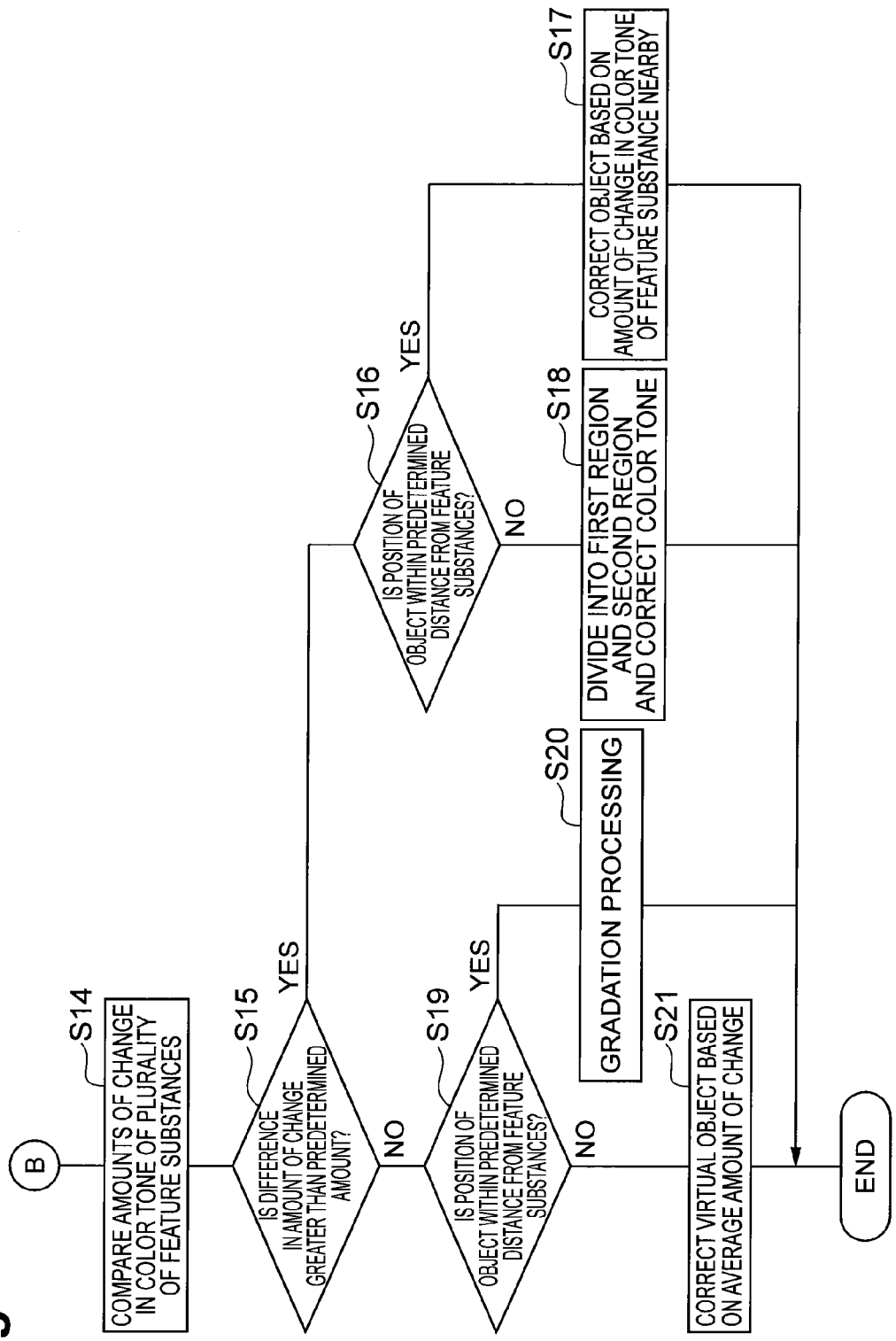
FIG. 17 is a flowchart showing processing of the object display method.

The processing of an object display method in the object display device 1 will now be described. FIG. 15 to FIG. 17 are flowcharts showing processing of the object display method.

First, referring to the flowchart in FIG. 15, the object display device 1 determines whether the image correction function for a virtual object is set ON (S1). If it is determined that the image correction function is set ON, the process procedure proceeds to step S2. If it is not determined that the image correction function is set ON, the process procedure proceeds to step S9, and correction of the virtual object is not performed.

In step S2, the image capturing unit 11 acquires an image in real space (S2). The feature region sensing unit 14 of the image feature extraction unit 12 then attempts to detect a feature substance from the image in real space (S3) and determines whether a feature substance is detected (S4). If it is determined that a feature substance is detected, the process procedure proceeds to step S5. If it is not determined that a feature substance is detected, the process procedure proceeds to step S10 in the flowchart shown in FIG. 10.

In step S5, the color tone change amount measuring unit 15 of the image feature extraction unit 12 attempts to extract the amount of change in color tone of the feature substance extracted by the feature region sensing unit 14 by referring to the feature region information storage unit 13 and determines whether there is a change in the color tone of the feature substance (S5). If it is determined that there is a change in color tone of the feature substance, the process procedure proceeds to step S6. If it is not determined that there is a change in color tone of the feature substance, the process procedure proceeds to step S9, and correction of the virtual object is not performed.

In step S6, the image feature extraction unit 12 determines whether there are a plurality of feature substances from which a change in color tone is detected (S6). If it is determined that there are a plurality of feature substances, the process procedure proceeds to step S7. If it is not determined that there are a plurality of feature substances, the process procedure proceeds to step S8.

In step S7, the image processing unit 18 performs correction processing on the image of the object acquired from the virtual object storage unit 17 based on the amounts of change in color tone of a plurality of feature substances (S7). In step S8, the image processing unit 18 performs correction processing on the image of the object acquired from the virtual object storage unit 17 based on the amount of change in color tone of one feature substance (S8). In step S9, the image processing unit 18 does not perform correction processing on the object.

Referring now to FIG. 16, the processing in the case where it is not determined that a feature substance is detected in step S4 is described. In step S10, the entire screen feature extraction unit 16 of the image feature extraction unit 12 attempts to extract a feature about an image from the entire image in real space (S10). The feature extracted here includes a feature about the color tone of the entire image in real space and a feature about a distribution of noise. If a feature is extracted from the entire image in real space (S11), the process procedure proceeds to step S12. If a feature is not extracted from the entire image in real space, the process procedure proceeds to step S13, and correction of the virtual object is not performed.

In step S12, the image processing unit 18 performs correction on the image of the object based on the feature of the entire image in real space that is extracted by the entire screen feature extraction unit 16 (S12). The correction processing in step S12 includes correction based on the color tone such as a dominant color component in the entire image or the average color tone of the entire image, and correction based on the noise distribution in the entire image. Both of the correction based on the color tone and the correction based on the noise distribution may be performed.

Referring now to FIG. 17, the processing in step S7 in FIG. 15 is described in details. First, the image processing unit 18 compares the amounts of change in color tone of a plurality of feature substances (S14) and determines whether the difference in the amounts of change is greater than a predetermined amount (S15). If it is determined that the difference in the amounts of change is greater than a predetermined amount, the process procedure proceeds to step S16. If it is not determined that the difference in the amounts of change is greater than a predetermined amount, the process procedure proceeds to step S19.

In step S16, the image processing unit 18 determines whether the position of the object is within a predetermined distance from the feature substances (S16). If it is determined that the position of the object is within a predetermined distance from the feature substances, the process procedure proceeds to step S17. If it is not determined that the position of the object is within a predetermined distance from the feature substances, the process procedure proceeds to step S18.

In step S17, the image processing unit 18 performs correction of color tone on the object that is the target of color correction, based on the amount of change in color tone of one of the feature substances located nearer to the object (S17). In step S18, the image processing unit 18 divides the object into a first region and a second region closer to the respective feature substances and corrects the color tone for each region based on the amount of change in color tone of the feature substance located near to that region (S18).

In step S19, the image processing unit 18 determines whether the position of the object is within a predetermined distance from the feature substances (S19). If it is determined that the position of the object is within a predetermined distance from the feature substances, the process procedure proceeds to step S20. If it is not determined that the position of the object is within a predetermined distance from the feature substances, the process procedure proceeds to step S21.

In step S20, the image processing unit 18 performs gradation processing on the object based on the amount of change in color tone of each feature substance (S20). In step S21, the image processing unit 18 performs correction of color tone on the object based on the average of the amounts of change in color tone of a plurality of feature substances (S21).

The image processing unit 18 then generates an overlaid image in which the object is overlaid on the image in real space through the process procedure in steps S7 to S9, S12 to S13, S17 to S18, and S20 to S21. The display unit 19 displays the overlaid image generated by the image processing unit 18.

In the present embodiment, the image feature extraction unit 12 has the feature region sensing unit 14 and the color tone change amount measuring unit 15 for acquiring the amounts of change in color tone of a plurality of feature substances (feature regions), and the entire screen feature extraction unit 16 for extracting the feature of the entire image in real space. However, the image feature extraction unit 12 may include either the feature region sensing unit 14 and the color tone change amount measuring unit 15 or the entire screen feature extraction unit 16. In other words, the image processing unit 18 may perform correction processing on an image of an object based on either the amounts of change in color tone of a plurality of feature substances or the feature of the entire image in real space.

Figure 18:
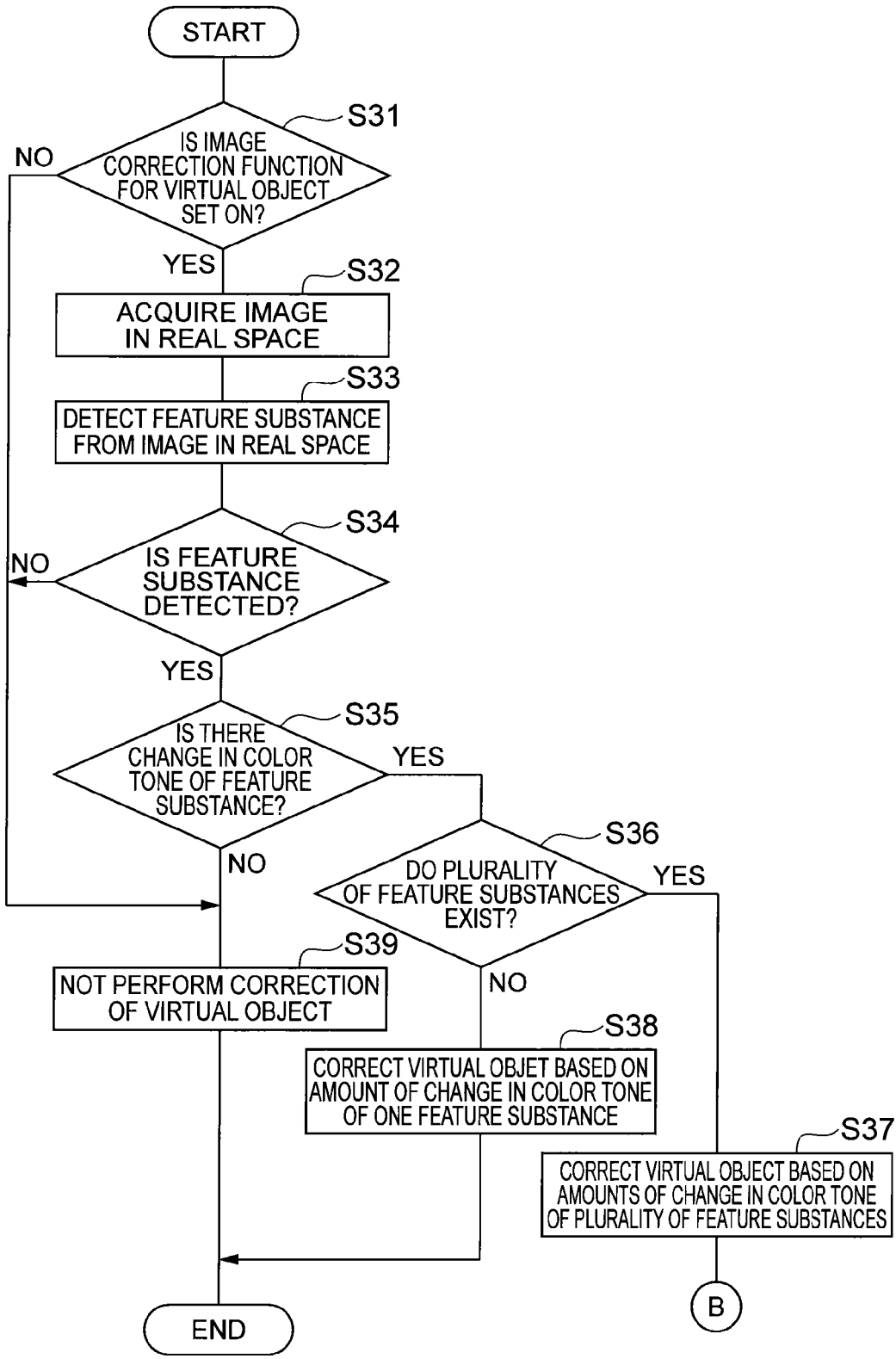
FIG. 18 is a flowchart showing correction processing based on the amount of change in color tone of a feature region.

FIG. 18 is a flowchart showing processing of performing correction processing on an image of an object based on the amounts of change in color tone of a plurality of feature substances. The processing in step S31 to S33 is similar to the processing in S1 to S3 in the flowchart in FIG. 15. In the following step S34, the feature region sensing unit 14 determines whether a feature substance is detected (S34). If it is determined that a feature substance is detected, the process procedure proceeds to step S35, and the image processing unit 18 performs correction processing on the object based on the amounts of change in color tone of a plurality of feature substances in the processing in steps S35 to S39 similar to steps S5 to S9.

If it is not determined that a feature substance is detected in step S34, the process procedure proceeds to step S39, and the correction processing on the virtual object is not performed. In the processing described using the flowchart in FIG. 18, the object display device 1 has information about the color tone of a feature substance and corrects the color tone of the object based on a change in color tone of such a feature substance, thereby easily performing correction processing.

Figure 19:
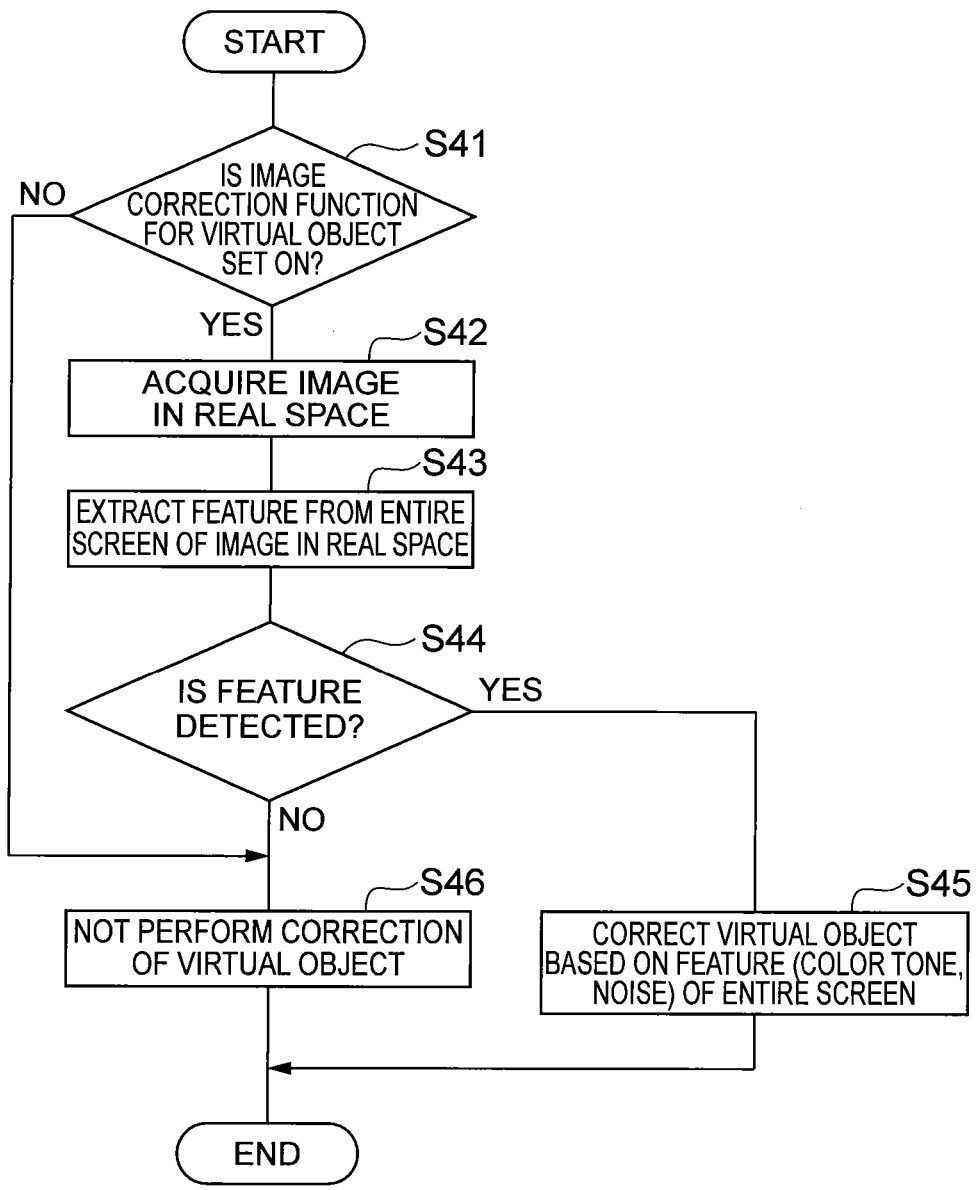
FIG. 19 is a flowchart showing correction processing based on a feature of the entire image in real space.

FIG. 19 is a flowchart showing processing of performing correction processing on an image of an object based on the feature of the entire image in real space. First, the object display device 1 determines whether the image correction function for a virtual object is set ON (S41). If it is determined that the image correction function is set ON, the process procedure proceeds to step S42. If it is not determined that the image correction function is set ON, the process procedure proceeds to step S46, and correction of the virtual object is not performed.

In step S42, the image capturing unit 11 acquires an image in real space (S42). The entire screen feature extraction unit 16 of the image feature extraction unit 12 then attempts to extract a feature about an image from the entire image in real space (S43). The feature extracted here includes a feature about the color tone of the entire image in real space and a feature about a distribution of noise. If a feature is extracted from the entire image in real space, the process procedure proceeds to step S45 (S44).

If a feature is not extracted from the entire image in real space (S44), the process procedure proceeds to step S46, and correction of the virtual object is not performed. In step S45, the image processing unit 18 performs correction processing on the image of the object based on the feature of the entire image in real space that is extracted by the entire screen feature extraction unit 16 (S45). In the processing described with reference to the flowchart in FIG. 19, the object display device 1 performs correction processing on the object based on, for example, the color tone of the entire image in real space, thereby reducing a sense of incongruity in the overlaid image.

Figure 20:
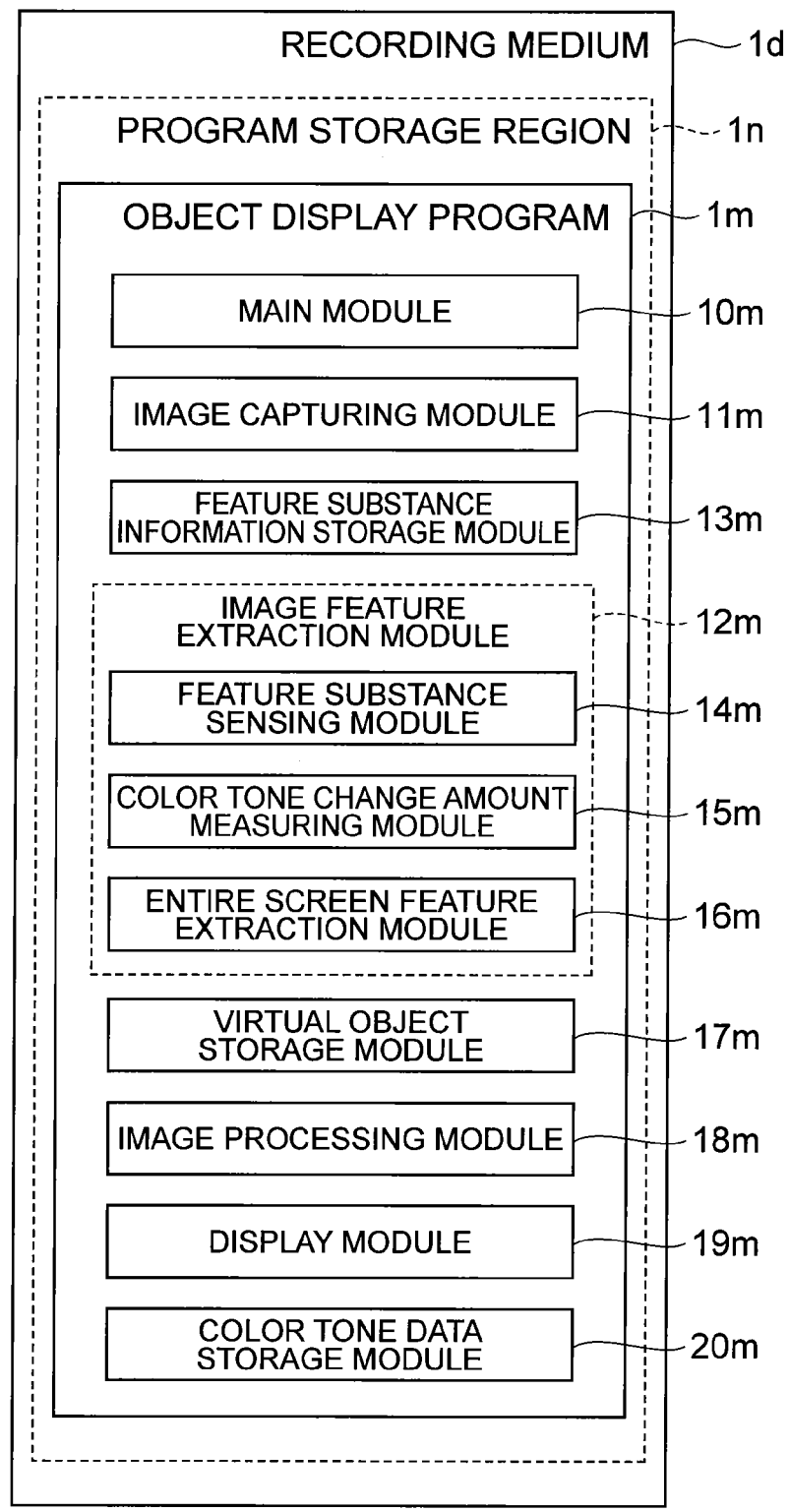
FIG. 20 is a diagram showing a configuration of an object display program.

An object display program that allows a computer to function as the object display device 1 in the present embodiment will now be described. FIG. 20 is a diagram showing a configuration of the object display program 1m corresponding to the object display device 1 shown in FIG. 1.

The object display program 1m is configured to include a main module 10m centrally controlling the object display process, an image capturing module 11m, an image feature extraction module 12m, a feature region information storage module 13m, a virtual object storage module 17m, an image processing module 18m, a display module 19m, and a color tone data storage module 20m. The image feature extraction module 12m includes a feature region sensing module 14m, a color tone change amount measuring module 15m, and an entire screen feature extraction module 16m. The modules 10m to 20m implement the respective functions for the functional units 11 to 20 in the object display device 1. The object display program 1m may be transmitted through a transmission medium such as a communication line or may be stored in a program storage region 1r of a recording medium 1d as shown in FIG. 11.

In the object display device 1, the object display method, and the object display program 1m in the present embodiment, a predetermined feature about an image is extracted from a plurality of feature substances or the entire image in real space by the image feature extraction unit 12 from the image in real space acquired by the image capturing unit 11. The image of the object is then subjected to correction processing based on the feature about the image, so that the feature of the image in real space is appropriately reflected in the image of the object. This reduces a sense of incongruity about the image of the object in the overlaid image in which the object is overlaid and displayed on the image in real space.

The present invention has been described in details above based on an embodiment thereof. However, the present invention is not limited to the foregoing embodiment. The present invention is susceptible to various modifications in a range that does not deviate from the spirit of the invention.

INDUSTRIAL APPLICABILITY

The present embodiment can reduce, in AR technology, a sense of incongruity about an image of an object in an overlaid image in which the object is overlaid and displayed on an image in real space.

REFERENCE SIGNS LIST

1 . . . object display device, 1d . . . recording medium, 1m . . . object display program, 1r . . . program storage region, 10m . . . main module, 11 . . . image capturing unit, 11m . . . image capturing module, 12 . . . image feature extraction unit, 12m . . . image feature extraction module, 13 . . . feature region information storage unit, 13m . . . feature region information storage module, 14 . . . feature region sensing unit, 14m . . . feature region sensing module, 15 . . . color tone change amount measuring unit, 15m . . . color tone change amount measuring module, 16 . . . entire screen feature extraction unit, 16m . . . entire screen feature extraction module, 17 . . . virtual object storage unit, 17m . . . virtual object storage module, 18 . . . image processing unit, 18m . . . image processing module, 19 . . . display unit, 19m . . . display module, 20 . . . color tone data storage unit, 20m . . . color tone data storage module.

The invention claimed is:

1. An object display device overlaying and displaying an object on an image in real space, the object display device comprising:
   circuitry configured to
   acquire an image in real space;
   extract a noise distribution feature from the entire image in real space, the noise distribution being computed based on a comparison of a feature of a pixel in the entire image to a feature of a second pixel that is a neighbor of the pixel in the entire image;
   perform correction processing on an image of the object based on the extracted noise distribution feature; and
   display an overlaid image in which the image of the object subjected to correction processing is overlaid on the image in real space.

2. The object display device according to claim 1, wherein the circuitry is further configured to perform correction processing on the image of the object based on an overlay position of the object in the image in real space.

3. The object display device according to claim 2, wherein the circuitry is further configured to perform correction processing on the image of the object by adjusting a color tone of the image of the object based on a gradation mechanism, the gradation mechanism being dependent on a gray scale of the entire image and the overlay position of the object in the image in real space.

4. The object display device according to claim 1, wherein the circuitry is further configured to
   extract a feature about a color tone of the entire image in real space, and
   perform correction processing based on the extracted color tone of the entire image in real space.

5. The object display device according to claim 1, wherein the circuitry is configured to compute the noise distribution based on a comparison of the feature of the pixel in the entire image to feature of pixels that are neighbors of the pixel in the entire image.

6. The object display device according to claim 5, wherein the circuitry is further configured to compute the noise distribution based on a comparison of a color tone of the pixel in the entire image to an average color tone of the pixels that are neighbors of the pixel in the entire image.

7. The object display device of according to claim 6, wherein the circuitry is further configured to determine the pixel in the entire image as a noise pixel based on the color tone of the pixel differing from the average color tone of the neighboring pixels by a predetermined amount.

8. An object display method performed in an object display device that overlays and displays an object on an image in real space, the object display method comprising:
   acquiring an image in real space;
   extracting by circuitry, a noise distribution feature from the entire image in real space, the noise distribution being computed based on a comparison of a feature of a pixel in the entire image to a feature of a second pixel that is a neighbor of the pixel in the entire image;
   performing correction processing on an image of the object based on the extracted noise distribution feature; and
   displaying an overlaid image in which the image of the object subjected to correction processing is overlaid on the image in real space.

9. A non-transitory computer readable medium having stored thereon a program that, when executed by a computer, causes the computer to perform a method of overlaying and displaying an object on an image in real space, the method comprising:
   acquiring an image in real space;
   extracting a noise distribution feature from the entire image in real space, the noise distribution being computed based on a comparison of a feature of a pixel in the entire image to a feature of a second pixel that is a neighbor of the pixel in the entire image;
   performing correction processing on an image of the object based on the extracted noise distribution feature; and
   displaying an overlaid image in which the image of the object subjected to correction processing is overlaid on the image in real space.

* * * * *